United States Patent
Sheng et al.

(10) Patent No.: US 12,387,396 B2
(45) Date of Patent: Aug. 12, 2025

(54) METHOD FOR DETERMINING DRAWING DATA OF MAP ELEMENT, ELECTRONIC DEVICE, AND NON- TRANSITORY COMPUTER-READABLE STORAGE MEDIUM

(71) Applicant: Beijing Baidu Netcom Science Technology Co., Ltd., Beijing (CN)

(72) Inventors: Changjun Sheng, Beijing (CN); Xiangxiao Kong, Beijing (CN); Juntao Tong, Beijing (CN); Yi Zeng, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 287 days.

(21) Appl. No.: 18/077,032

(22) Filed: Dec. 7, 2022

(65) Prior Publication Data
US 2023/0177749 A1    Jun. 8, 2023

(30) Foreign Application Priority Data
Dec. 8, 2021   (CN) .......................... 202111493865.2

(51) Int. Cl.
*G06T 11/20* (2006.01)
(52) U.S. Cl.
CPC .................................. *G06T 11/203* (2013.01)
(58) Field of Classification Search
None
See application file for complete search history.

(56) References Cited

U.S. PATENT DOCUMENTS

| | | | |
|---|---|---|---|
| 5,925,090 A * | 7/1999 | Poonsaengsathit | ......................... G01C 21/3655 340/990 |
| 6,363,161 B2 * | 3/2002 | Laumeyer | ............ G06V 20/582 382/104 |

(Continued)

FOREIGN PATENT DOCUMENTS

| CN | 101882175 A | 11/2010 |
|---|---|---|
| CN | 109658504 A | 4/2019 |

(Continued)

OTHER PUBLICATIONS

Supplementary Search Report issued on Aug. 2, 2023 by the CIPO in the corresponding Patent Application No. 202111493865.2, with English translation.

(Continued)

*Primary Examiner* — Jason A Pringle-Parker
(74) *Attorney, Agent, or Firm* — NORTON ROSE FULBRIGHT US LLP

(57) ABSTRACT

Provided are a method for determining drawing data of a map element, an electronic device, and a non-transitory computer-readable storage medium. The specific implementation scheme includes determining a reference point position of a non-link element according to a relationship between the non-link element and adjacent link elements in an electronic map and based on lane edge positions of the adjacent link elements; determining a direction of the non-link element according to the relationship between the non-link element and the adjacent link elements; and determining drawing data of the non-link element according to the reference point position and the direction of the non-link element, where the drawing data is used for drawing and rendering an image of the non-link element in a link when the drawing data is loaded by a map interface.

20 Claims, 13 Drawing Sheets

(56) References Cited

U.S. PATENT DOCUMENTS

| | | | |
|---|---|---|---|
| 8,892,356 B1* | 11/2014 | Weiland | B60W 50/14 |
| | | | 701/454 |
| 8,930,139 B2* | 1/2015 | Goddard | G01C 21/3673 |
| | | | 701/457 |
| 2002/0133291 A1* | 9/2002 | Hamada | G01C 21/3638 |
| | | | 340/990 |
| 2006/0074553 A1* | 4/2006 | Foo | G01C 21/367 |
| | | | 340/995.15 |
| 2007/0168119 A1 | 7/2007 | Mori | |
| 2008/0074423 A1* | 3/2008 | Gan | G06F 16/84 |
| | | | 707/E17.124 |
| 2010/0328316 A1* | 12/2010 | Stroila | G06V 20/588 |
| | | | 707/769 |
| 2013/0006518 A1* | 1/2013 | Ozaki | G01C 21/3644 |
| | | | 701/411 |
| 2016/0033296 A1 | 2/2016 | Yeh | |
| 2016/0176358 A1* | 6/2016 | Raghu | G06T 7/579 |
| | | | 382/104 |
| 2020/0201891 A1 | 6/2020 | Mswanathan | |

FOREIGN PATENT DOCUMENTS

| | | |
|---|---|---|
| CN | 111696170 A | 9/2020 |
| CN | 112085814 A | 12/2020 |
| CN | 112541049 A | 3/2021 |
| KR | 20210064121 A | 6/2021 |

OTHER PUBLICATIONS

First Search Report issued on May 27, 2023 by the CIPO in the corresponding Patent Application No. 202111493865.2, with English translation.

First Office Action issued on Jun. 1, 2023 by the CIPO in the corresponding Patent Application No. 202111493865.2, with English translation.

* cited by examiner

METHOD FOR DETERMINING DRAWING DATA OF MAP ELEMENT, ELECTRONIC DEVICE, AND NON- TRANSITORY COMPUTER-READABLE STORAGE MEDIUM

CROSS-REFERENCE TO RELATED APPLICATION(S)

This application claims priority from Chinese Patent Application No. 202111493865.2 filed Dec. 8, 2021, the disclosure of which is incorporated herein by reference in its entirety.

TECHNICAL FIELD

The present disclosure relates to the field of computer technologies and, in particular, to automatic driving, a high-precision map, and image processing technologies.

BACKGROUND

With the development of electronic map technologies, people have become accustomed to using an electronic map for information query and link navigation. Based on point of interest (POI) data stored in the electronic map, a two-dimensional (2D) or three-dimensional (3D) image may be rendered on a map interface for a user to know a specific scene picture.

High-precision map data includes various map elements, such as direction signs on links, toll booths and other POIs. However, when the map interface is presented to the user, for example, in a navigation scenario, the map element such as the direction sign or the toll booth is only presented as one icon at a location point. Therefore, it is impossible for the user to obtain vivid and abundant information, thereby reducing the use experience.

SUMMARY

The present disclosure provides a method for determining drawing data of a map element, an electronic device, and a non-transitory computer-readable storage medium, so as to improve a display effect of a non-link element in an electronic map.

According to an embodiment of the present disclosure, a method for determining drawing data of a map element is provided and includes steps described below.

A reference point position of a non-link element is determined according to a relationship between the non-link element and adjacent link elements in an electronic map and based on lane edge positions of the adjacent link elements.

A direction of the non-link element is determined according to the relationship between the non-link element and the adjacent link elements.

Drawing data of the non-link element is determined according to the reference point position and the direction of the non-link element, where the drawing data is used for drawing and rendering an image of the non-link element in a link when the drawing data is loaded by a map interface.

According to another embodiment of the present disclosure, an electronic device is provided and includes at least one processor and a memory communicatively connected to the at least one processor.

The memory stores an instruction executable by the at least one processor, and the instruction is executed by the at least one processor to cause the at least one processor to perform: determining a reference point position of a non-link element according to a relationship between the non-link element and adjacent link elements in an electronic map and based on lane edge positions of the adjacent link elements; determining a direction of the non-link element according to the relationship between the non-link element and the adjacent link elements; and determining drawing data of the non-link element according to the reference point position and the direction of the non-link element, wherein the drawing data is used for drawing and rendering an image of the non-link element in a link when the drawing data is loaded by a map interface.

According to another embodiment of the present disclosure, a non-transitory computer-readable storage medium is provided. The storage medium stores computer instructions for causing a computer to perform: determining a reference point position of a non-link element according to a relationship between the non-link element and adjacent link elements in an electronic map and based on lane edge positions of the adjacent link elements; determining a direction of the non-link element according to the relationship between the non-link element and the adjacent link elements; and determining drawing data of the non-link element according to the reference point position and the direction of the non-link element, wherein the drawing data is used for drawing and rendering an image of the non-link element in a link when the drawing data is loaded by a map interface.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the scheme and not to limit the present disclosure.

DETAILED DESCRIPTION

Figure 1:
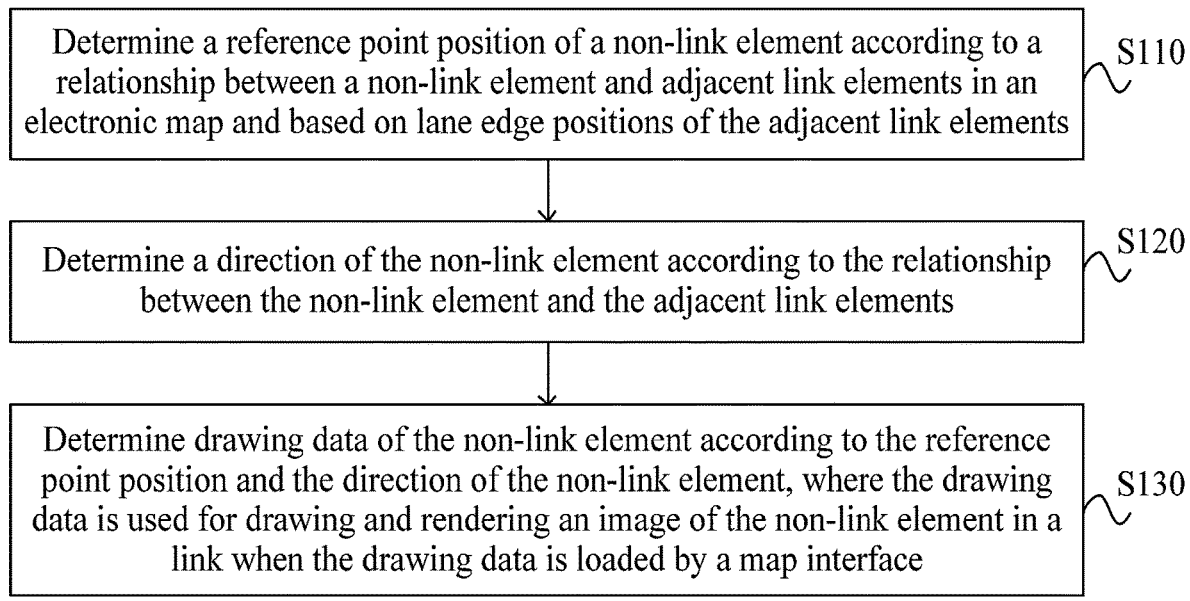
FIG. 1 is a flowchart of a method for determining drawing data of a map element according to an embodiment of the present disclosure.

Example embodiments of the present disclosure, including details of embodiments of the present disclosure, are described hereinafter in conjunction with the drawings to facilitate understanding. The example embodiments are illustrative only. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

A non-link element often records position data, an element type, a content attribute and other information in original data of an electronic map. The position data usually expresses the position in a form of a point position. In the case where the position data needs to be presented in the electronic map in a form of an image, only an icon may often be displayed at the point position and it is difficult to present an image that is close to a real effect. To draw a realistic image, the non-link element needs to be rendered as a two-dimensional plane or a three-dimensional stereoscopic image. In the case where drawing data of the non-link element of the two-dimensional plane or the three-dimensional stereoscopic image is determined, in the embodiments of the present disclosure, an image condition of a link element is used as a reference to determine drawing data of a non-link image. The drawing data of the non-link element mainly includes a reference point position and a direction so that a corresponding image may be drawn and rendered in conjunction with a type effect template of the non-link element. The following embodiments of the present disclosure respectively introduce determination schemes of the drawing data.

FIG. 1 is a flowchart of a method for determining drawing data of a map element according to an embodiment of the present disclosure. This embodiment may be applicable to the case of determining and generating the drawing data of the non-link element in order that a more vivid and specific map element can be drawn in an electronic map. The method may be performed by an apparatus for determining drawing data of a map element provided in the embodiments of the present disclosure, and the apparatus may be implemented in software and/or hardware. The apparatus may be configured in an electronic device with corresponding data processing capabilities, and the method includes steps described below.

In S110, a reference point position of a non-link element is determined according to a relationship between a non-link element and adjacent link elements in an electronic map and based on lane edge positions of the adjacent link elements.

Link elements are used for a link, in a current electronic map, on which a user can travel, have different link levels, such as an expressway and a national link and are recorded as link elements in the electronic map. The non-link element is not used for the link, but a link-related traffic facility, such as a service area, a gas station, and a direction sign.

In an embodiment, the electronic map stores relevant data of link elements and non-link elements. Some non-link elements are usually located around the link, so the link element within a set distance of the non-link element may be determined as an adjacent link element based on a position of the non-link element.

In the embodiments of the present disclosure, a precise position of the link needs to be a reference to determine the reference point position of the non-link element. In an embodiment, a lane edge position of the adjacent link element is used as a precise position reference to determine the reference point position of the non-link element. In this manner, the reference point position of the non-link element may be quickly determined without new positioning data introduced. Lane edges of the link may be acquired from a high-precision map and are lines representing boundaries on two sides of each lane. The boundary of a lane may consist of lane edges connected segment by segment. In original data of the electronic map, a correspondence between point position data of the non-link element and the link is recorded, but the point position of the non-link element may not necessarily have a definite correspondence with the lane edge of the link. To facilitate drawing and rendering, a definite correspondence may be established between the reference point position of the non-link element and the lane edge, so as to facilitate the drawing of the non-link element with reference to the link. For example, the reference point position of the non-link element may be on the lane edge on either side of the link or at a center of the lane edges on two sides of the link.

In S120, a direction of the non-link element is determined according to the relationship between the non-link element and the adjacent link elements.

The direction of the non-link element that assists the passage of vehicles in the link is often related to the link so that the user can see an effect matching a direction of the link from the map. The direction of the non-link element may be determined based on the relationship between the non-link element and the adjacent link elements. For example, the direction of the non-link element may be in a same direction as the link or at a set angle with the direction of the link.

In S130, drawing data of the non-link element is determined according to the reference point position and the direction of the non-link element.

The drawing data is used for drawing and rendering an image of the non-link element in a link when the drawing data is loaded by a map interface.

The drawing data is the data required for further drawing and rendering of display contents of the non-link element based on the reference point position and direction, such as display effect templates of various element types, the image contrast and color, a size in a display image and other information.

In an embodiment, after the reference point position and direction of the non-link element are obtained, the reference point position and direction may be prestored in a database of the high-precision map, and when the user requests to acquire a map image, the non-link element may be rendered and displayed.

In the embodiments of the present disclosure, the reference point position and direction of the non-link element are determined according to the relationship between the non-link element and the adjacent link elements and the lane edge positions of the adjacent link elements, and the drawing data that may be used for drawing an image is generated, thereby improving the display effect of the non-link element in the electronic map.

Based on the preceding disclosed embodiment, in an embodiment, text contents of the non-link element may be further determined according to attribute contents of the non-link element in electronic map data, and the text contents are determined as the drawing data of the non-link element.

The attribute contents may be data of the non-link element recorded in the electronic map. Attribute contents of some non-link elements may include text contents of the non-link elements, which is generally text information presented in a real element.

In an embodiment, an element name of a current non-link element may be acquired in the electronic map, such as XXX toll booth and a direction sign showing YY link. According to the name of the current non-link element, the text contents of the current non-link element may be directly extracted from the name, or the text contents may be extracted after a certain degree of semantic completion of the name in conjunction with a current adjacent link element. After the text contents of the current non-link element are extracted, the text contents are used as a part of the drawing data of the non-link element and presented in an image effect during subsequent rendering. In the embodiment of the present disclosure, the text contents of the non-link element are further acquired, thereby increasing the richness of the displayable content in the corresponding image.

Figure 2A:
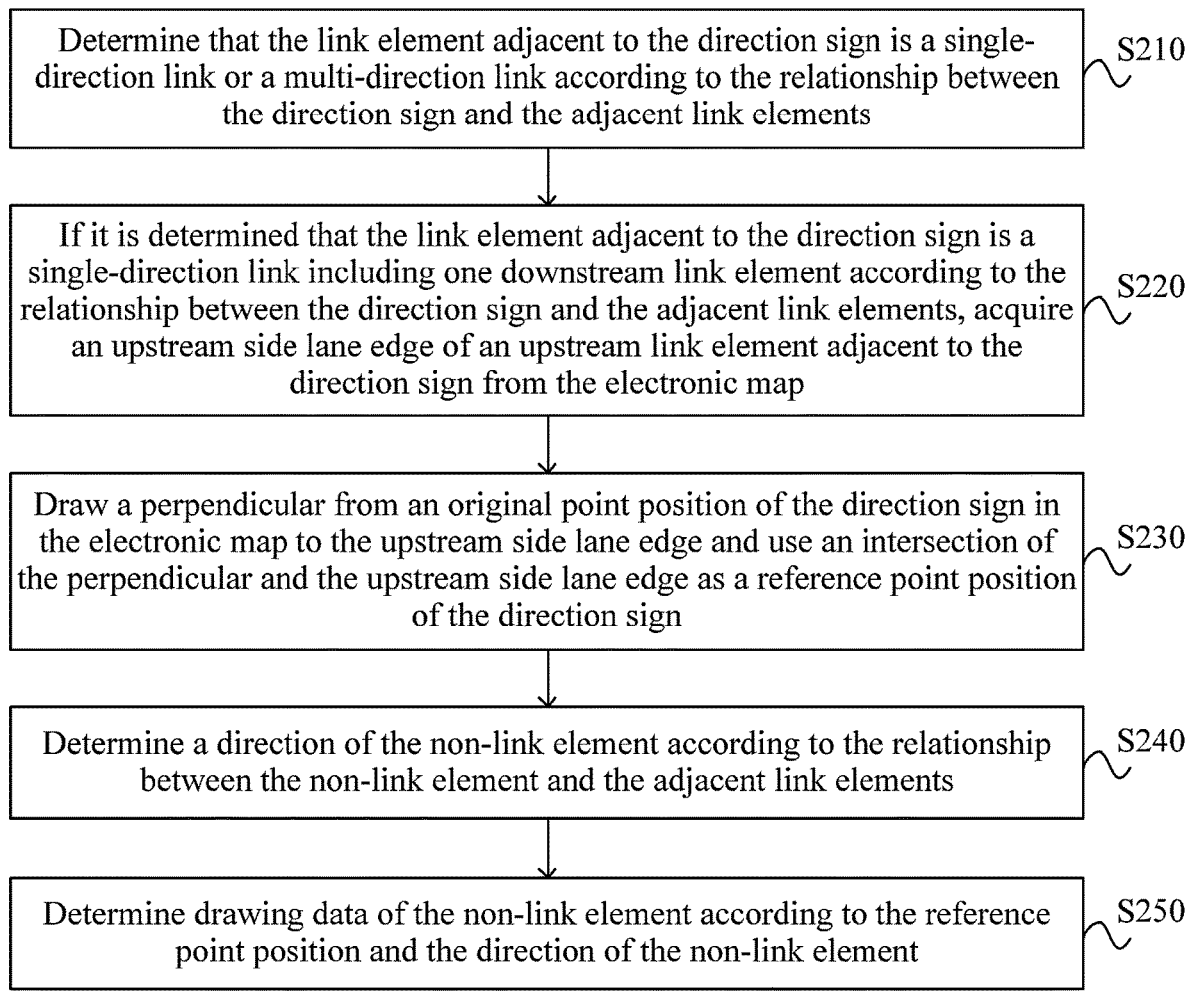
FIG. 2A is a flowchart of a method for determining drawing data of a map element according to another embodiment of the present disclosure.

FIG. 2A is a flowchart of a method for determining drawing data of a map element according to another embodiment of the present disclosure. Based on the preceding embodiments, in this embodiment, a drawing data determination manner in the case where the non-link element is a direction sign is provided, and the step in which "the reference point position of the non-link element is determined according to the relationship between the non-link element and the adjacent link elements in the electronic map and based on the lane edge positions of the adjacent link elements" is refined into that "if it is determined that a link element adjacent to the direction sign is a single-direction link comprising one downstream link element according to a relationship between the direction sign and the adjacent link elements, an upstream side lane edge of an upstream link element adjacent to the direction sign is acquired from the electronic map; and a perpendicular line from an original point position of the direction sign in the electronic map to the upstream side lane edge is drawn and an intersection of the perpendicular line and the upstream side lane edge is used as a reference point position of the direction sign", thereby describing the manner for determining the reference point position of the direction sign in the case where the non-link element is the direction sign.

In an embodiment, referring to FIG. 2A, the method may include steps described below.

In S210, it is determined that the link element adjacent to the direction sign is a single-direction link or a multi-direction link according to the relationship between the direction sign and the adjacent link elements.

The relationship between the link and the direction sign is generally recorded in the electronic map and the link may be determined as a single-direction link or a multi-direction link based on the number of downstream links adjacent to the direction sign.

In S220, if it is determined that the link element adjacent to the direction sign is a single-direction link including one downstream link element according to the relationship between the direction sign and the adjacent link elements, an upstream side lane edge of an upstream link element adjacent to the direction sign is acquired from the electronic map.

In S230, a perpendicular line from an original point position of the direction sign in the electronic map to the upstream side lane edge is drawn and an intersection of the perpendicular line and the upstream side lane edge is used as a reference point position of the direction sign.

The upstream of the link element is a vehicle coming direction of a current link, and the downstream of the link element is a vehicle going direction of the current link element. Taking a vehicle driven on the link as an example, a front of the vehicle faces the downstream of the current link element, and a rear of the vehicle faces the upstream of the current link.

In an embodiment, the link element adjacent to the direction sign may be determined in the electronic map. If the link element adjacent to the current direction sign includes only a single-direction link with one downstream link element, it means that a link position where the current sign is located has only one vehicle going direction, and the direction sign is usually displayed directly on a side of the link so that the intersection of the perpendicular line passing through the original point position and the upstream side lane edge may be acquired and used as the reference point position of the direction sign, thereby completely reproducing a real link scenario as much as possible.

Figure 2B:
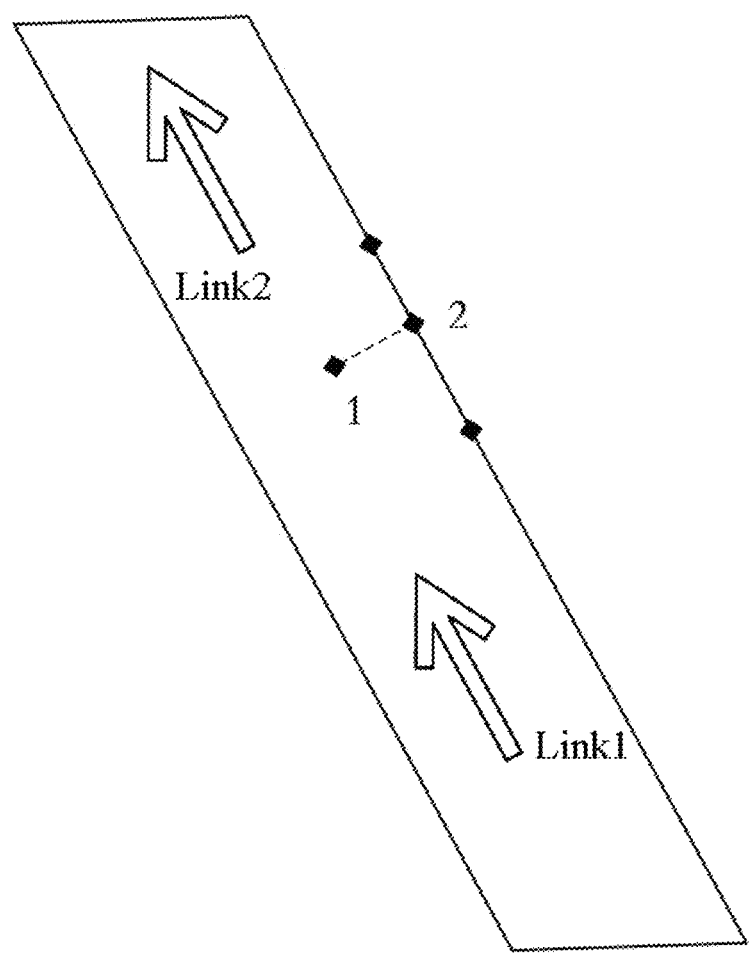
FIG. 2B is a schematic diagram of a positional relationship between a direction sign and a link to which an embodiment of the present disclosure is applicable.

For example, FIG. 2B is a schematic diagram of a positional relationship between a direction sign and a link to which an embodiment of the present disclosure is applicable. The electronic map records that the direction sign is located between a first link (link1) and a second link (link2). One link2 exists on a downstream link of the direction sign, indicating that the current link is a single-direction link. Point 1 is an original point position of the direction sign in the electronic map, and point 2 is a foot of a perpendicular line from point 1 to the upstream side lane edge of the upstream link1 and used as the reference point position of the direction sign.

In S240, a direction of the non-link element is determined according to the relationship between the non-link element and the adjacent link elements.

In this embodiment, to cooperate with the user on the vehicle viewing the contents of the direction sign, the direction of the direction sign may be configured to be perpendicular to a direction of the upstream link.

In S250, drawing data of the non-link element is determined according to the reference point position and the direction of the non-link element.

The drawing data is used for drawing and rendering an image of the non-link element in a link when the drawing data is loaded by a map interface.

Through the technical schemes of this embodiment, on a single-direction link, a direction sign with a direction perpendicular to the link may be drawn from a lane edge on a side which is used as the reference point position, thereby presenting a display effect of the sign to the user.

Figure 3A:
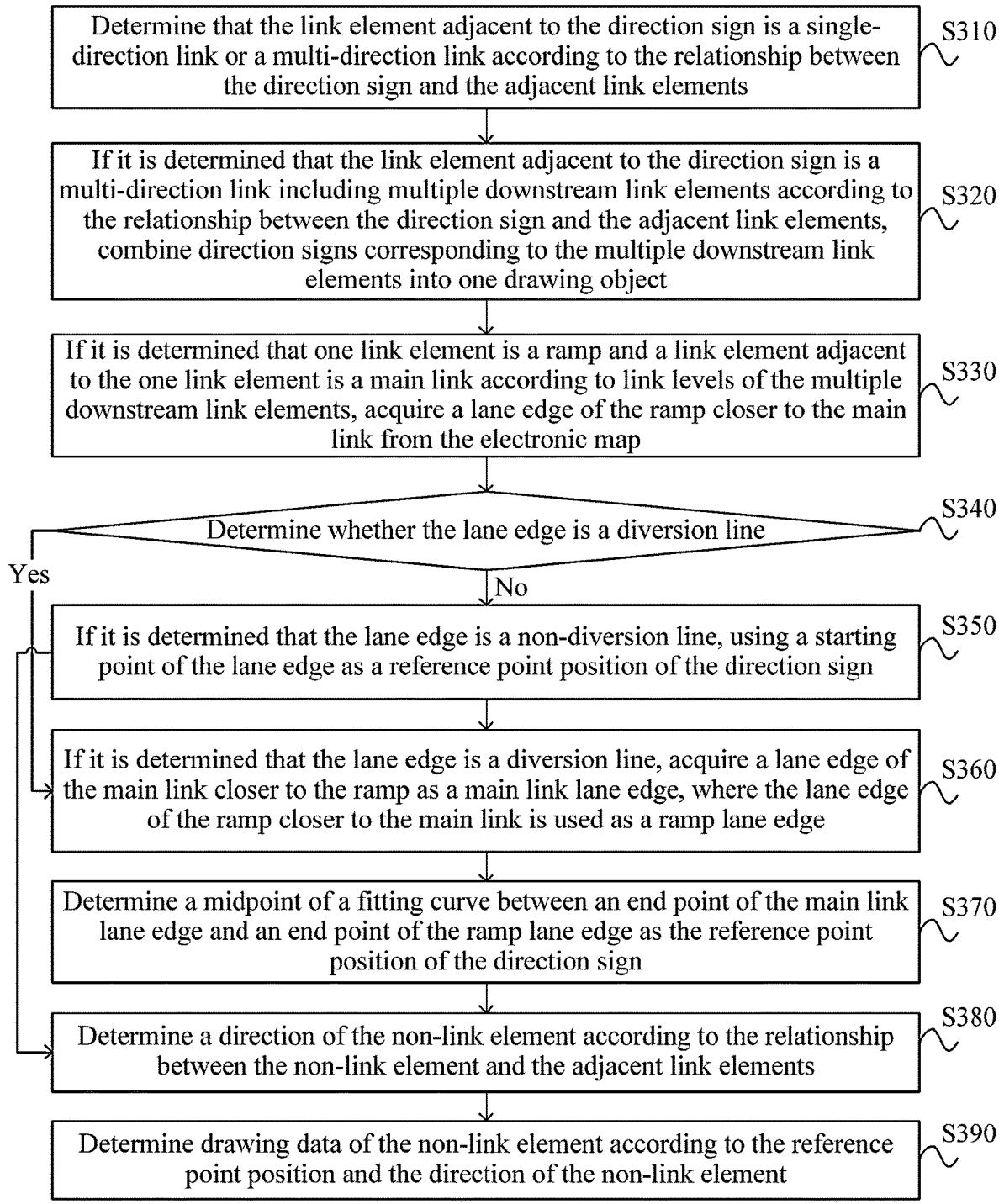
FIG. 3A is a flowchart of a method for determining drawing data of a map element according to another embodiment of the present disclosure.

FIG. 3A is a flowchart of a method for determining drawing data of a map element according to another embodiment of the present disclosure. Based on the preceding embodiments, a manner for determining drawing data in the case where the non-link element is the direction sign is provided. The step in which "the reference point position of the non-link element is determined according to the relationship between the non-link element and the adjacent link elements in the electronic map and based on the lane edge positions of the adjacent link elements" is refined into that "if it is determined that a link element adjacent to the direction sign is a multi-direction link including multiple downstream link elements according to a relationship between the direction sign and the adjacent link elements, direction signs corresponding to the multiple downstream link elements are combined into one drawing object; if it is determined that one link element is a ramp and a link element adjacent to the one link element is a main link according to link levels of the multiple downstream link elements, a lane edge of the ramp closer to the main link is acquired from the electronic map; and if it is determined that the lane edge is a non-diversion line, a starting point of the lane edge is used as a reference point position of the direction sign", thereby describing how to determine the reference point position of the direction sign in the case where the non-link element is the direction sign.

In an embodiment, referring to FIG. 3A, the method may include steps described below.

In S310, it is determined that the link element adjacent to the direction sign is a single-direction link or a multi-direction link according to the relationship between the direction sign and the adjacent link elements.

In S320, if it is determined that the link element adjacent to the direction sign is a multi-direction link including multiple downstream link elements according to the relationship between the direction sign and the adjacent link elements, direction signs corresponding to the multiple downstream link elements are combined into one drawing object.

In the case where multiple links exists in the downstream of the direction signs, there may be multiple direction signs pointing to the downstream links, respectively. These direction signs are combined into one drawing object for drawing and rendering so that a rendering process is more convenient and accurate, and conflicts do not easily occur in a rendering effect. As a drawing object, a reference point position may be used for positioning, but other drawing data such as the text content of each direction sign in the drawing object may be provided separately.

In S330, if it is determined that one link element is a ramp and a link element adjacent to the one link element is a main link according to link levels of the multiple downstream link elements, a lane edge of the ramp closer to the main link is acquired from the electronic map.

In a specific case where multiple downstream links include ramps, the drawing of ramps and diversion zones may be further considered.

In S340, whether the lane edge is a diversion line is determined; if so, S360 is performed, and otherwise, S350 is performed.

In S350, if it is determined that the lane edge is a non-diversion line, a starting point of the lane edge is used as a reference point position of the direction sign.

The link level may be a link attribute recorded in the electronic map. In the case where the corresponding level information is not prestored in the electronic map, the level information may be determined by comparing the link widths, the numbers of lane edges and other link information. Whether the lane edge is a diversion line may be recorded in the electronic map.

In an embodiment, multiple downstream link elements exist and are included in the link adjacent to the direction sign. According to the link level corresponding to each downstream link element, the link element with the highest level is determined as the main link, and other link elements with relatively low levels are classified as ramps. Considering that a diversion line often appears when a ramp occurs, to improve the applicability of the method and the positioning accuracy of the reference point position in the case where multiple downstream link elements exist, in the embodiments of the present disclosure, after the main link and the ramp are distinguished, in the case where no diversion line exists, the starting point of the lane edge on a side of the ramp closer to the main link is directly used as the reference point position so that the direction sign is displayed accurately and the vehicle heading toward the ramp can quickly enter the ramp. The starting point of the lane edge on a side of the ramp closer to the main link is where the ramp separates from the lane edge of the main link.

Figure 3B:
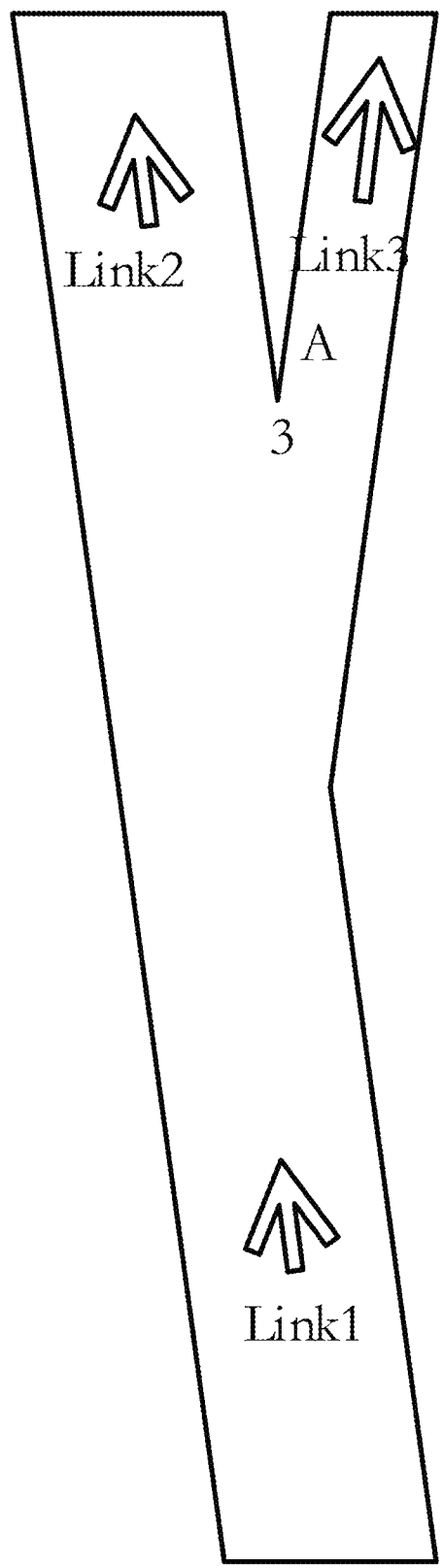
FIG. 3B is a schematic diagram of a position of a direction sign when no diversion line exists to which an embodiment of the present disclosure is applicable.

For example, FIG. 3B is a schematic diagram of a position of a direction sign when no diversion line exists to which an embodiment of the present disclosure is applicable.

The first link (link1), the second link (link2) and the third link (link3) are recorded in the electronic map, and the direction sign is located between link1, and link2 and link3. According to the link levels of link 2 and link 3 in FIG. 3B, it is determined that link 3 is a ramp; the corresponding high-precision link lane edge data is obtained through the ramp link 3, the lane edge data has two lines on the left and right, and a boundary line A closest to link 2 is selected; point 3 which is the starting point of the boundary line A is directly used as the reference point position of the direction sign.

In S360, if it is determined that the lane edge is a diversion line, a lane edge of the main link closer to the ramp is acquired as a main link lane edge, where the lane edge of the ramp closer to the main link is used as a ramp lane edge.

In S370, a midpoint of a fitting curve between an end point of the main link lane edge and an end point of the ramp lane edge is determined as the reference point position of the direction sign.

In an embodiment, due to the existence of a diversion area, a certain discrepancy usually exists between an actual entrance of the ramp and the position of the direction sign. To solve this problem, in the embodiments of the present disclosure, in the case where it is determined that the lane edge is a diversion line, it is determined that a diversion area actually exists at the entrance of the ramp, and due to the existence of the diversion area, if the direction sign is displayed at the starting point of the lane edge, the diversion area is blocked. Therefore, the midpoint of the fitting curve connecting the end point of the main link lane edge and the end point of the ramp lane edge may be used as the reference point position of the current direction sign so that not only the normal processing of the direction sign in the existence of the diversion area is achieved, but also an identification function of the direction sign is effectively played and the user is prevented from being unable to enter the entrance of the ramp normally. The main link lane edge and the ramp lane edge are first segment lane edges in the main link and the ramp, respectively and correspond to the position of the diversion area.

Figure 3C:
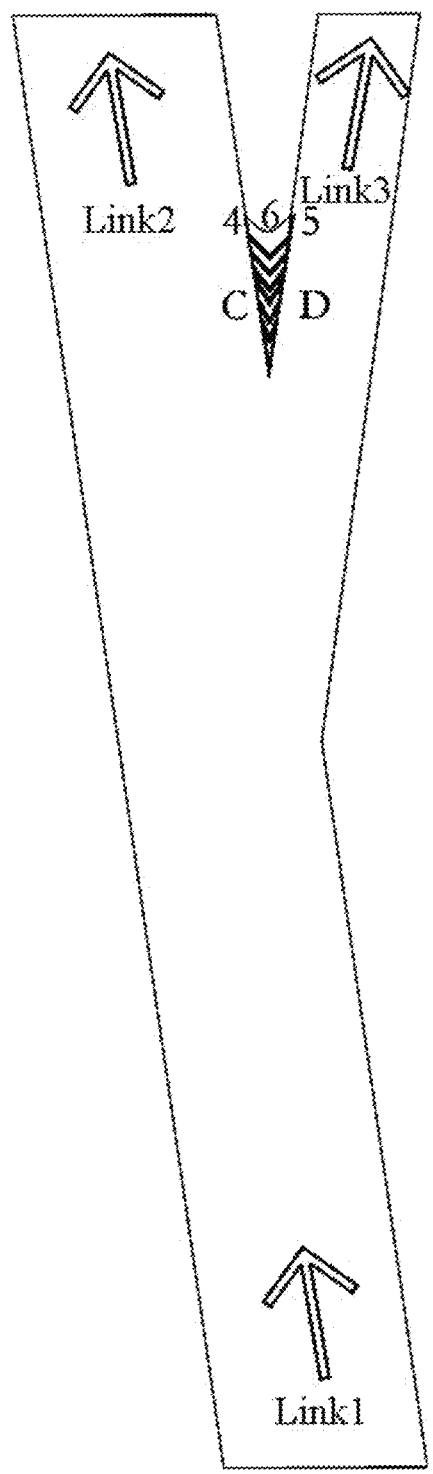
FIG. 3C is a schematic diagram of a position of a direction sign when a diversion line exists to which an embodiment of the present disclosure is applicable.

For example, FIG. 3C is a schematic diagram of a position of a direction sign when a diversion line exists to which an embodiment of the present disclosure is applicable.

The first link (link1), the second link (link2) and the third link (link3) are recorded in the electronic map, and the direction sign is located between link1, and link2 and link3. According to the link levels of link 2 and link 3 in FIG. 3C, it is determined that link2 is the main link and link3 is the ramp.

Among the high-precision link lane edges acquired through the ramp link3 and corresponding to the ramp link3, a lane edge closer to link2 is a diversion line and used as a ramp lane edge D, or it may be determined that a diversion zone exists between link2 and link3.

If the selected boundary line is a diversion line, the diversion area is drawn here. In this case, the first segment lane edge (near link3) on the rightmost side of link2 needs to be used as a main link lane edge C. A midpoint 6 of a fitting curve between an end point 4 of the main link lane edge C and an end point 5 of the ramp lane edge D is used as the reference point position of the direction sign. The position of the midpoint of the fitting curve can make the drawing position of the direction sign roughly at an end of the diversion area so that the effect is beautiful. A Bézier curve may be used for presenting a certain arc between the end point 4 and the end point 5.

In S380, a direction of the non-link element is determined according to the relationship between the non-link element and the adjacent link elements.

In S390, drawing data of the non-link element is determined according to the reference point position and the direction of the non-link element.

The drawing data is used for drawing and rendering an image of the non-link element in a link when the drawing data is loaded by a map interface.

In the technical schemes of the embodiments of the present disclosure, the relationship between a diversion zone image and a direction sign image is considered and the reference point position of the direction sign is effectively adjusted based on the position of the diversion zone so that the two images can be displayed in coordination.

Figure 4A:
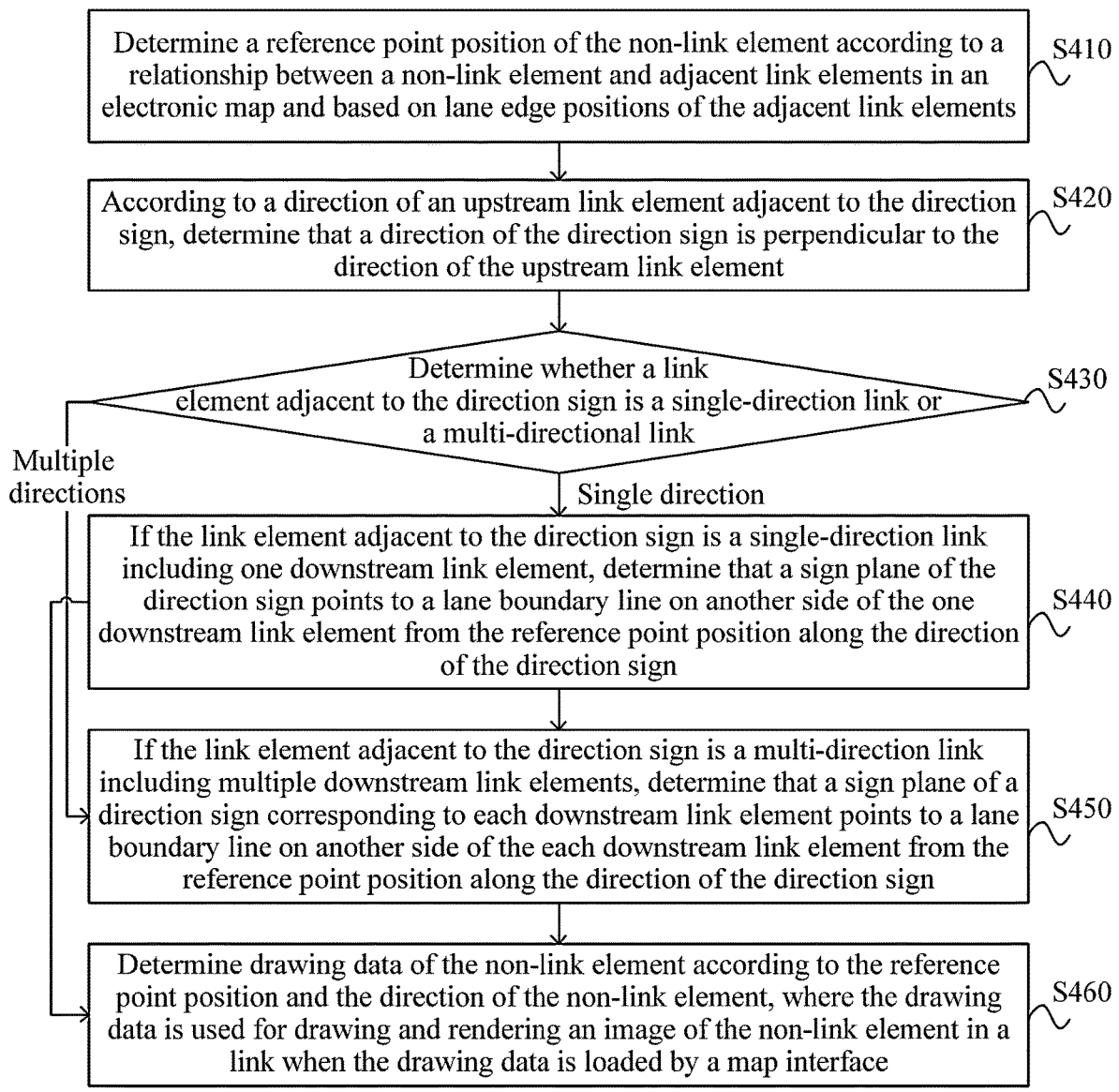
FIG. 4A is a flowchart of a method for determining drawing data of a map element according to another embodiment of the present disclosure.

FIG. 4A is a flowchart of a method for determining drawing data of a map element according to another embodiment of the present disclosure. Based on the preceding embodiments, in this embodiment, the non-link element is refined into a direction sign, and the step in which "the direction of the non-link element is determined according to the relationship between the non-link element and the adjacent link elements" is refined into that "according to a direction of an upstream link element adjacent to the direction sign, it is determined that a direction of the direction sign is perpendicular to the direction of the upstream link element", thereby describing how to determine a direction of a specific link element in the case where the non-link element is the direction sign.

In S410, a reference point position of the non-link element is determined according to a relationship between a non-link element and adjacent link elements in an electronic map and based on lane edge positions of the adjacent link elements.

In S420, according to a direction of an upstream link element adjacent to the direction sign, it is determined that a direction of the direction sign is perpendicular to the direction of the upstream link element.

In an embodiment, to help the user to intuitively determine directions identified by the current direction sign, after the direction of the upstream link element is determined, the direction of the direction sign is configured to be perpendicular to the direction of the current link, a starting point of the direction is a side of a link where the reference point position of the current direction sign is located, and the direction is determined according to specific identification content of the current direction sign.

In an embodiment, after it is determined that the direction of the direction sign is perpendicular to the direction of the upstream link element, the method further includes steps described below.

In S430, whether a link element adjacent to the direction sign is a single-direction link or a multi-direction link is determined.

In S440, if the link element adjacent to the direction sign is a single-direction link including one downstream link element, it is determined that a sign plane of the direction sign points to a lane boundary line on another side of the one downstream link element from the reference point position along the direction of the direction sign.

In S450, if the link element adjacent to the direction sign is a multi-direction link including multiple downstream link elements, it is determined that a sign plane of a direction sign corresponding to each downstream link element points to a lane boundary line on another side of the each downstream link element from the reference point position along the direction of the direction sign.

In an embodiment, in the case where the link element adjacent to the direction sign is a single-direction link including one downstream link element, according to a general physical state, a direction of the sign plane of the direction sign is configured to face the lane boundary line on another side of the current link and generally from a right side of the link to a left side of the link. In the case where the link element adjacent to the direction sign is a multi-direction link including multiple downstream link elements, multiple direction signs might exist, each direction sign is placed on the same pole and points from one side of the link to the other side, and the plane orientation of each direction sign is configured to point to the lane boundary line on another side of the identified downstream link element. A display direction of the sign plane is associated with the reference point position and a specific direction of the identified downstream link element so that an identification effect of the direction sign for different directions in different forms is improved, thereby improving the user experience.

Figure 4B:
FIG. 4B is a schematic diagram of determination of a direction of a direction sign to which an embodiment of the present disclosure is applicable.

For example, FIG. 4B is a schematic diagram of determination of a direction of a direction sign to which an embodiment of the present disclosure is applicable.

Point 7 is a determined reference point position of the direction sign, and a sign plane of each direction sign of two direction signs points to the lane boundary line on another side of the downstream link element where the each direction sign is located along the direction of the each direction sign.

In S460, drawing data of the non-link element is determined according to the reference point position and the direction of the non-link element, where the drawing data is used for drawing and rendering an image of the non-link element in a link when the drawing data is loaded by a map interface.

Based on the preceding disclosed embodiments, in an embodiment, the step in which if the non-link element is a direction sign, the text contents of the non-link element are determined according to the attribute contents of the non-link element in the electronic map data and the text contents are determined as the drawing data of the non-link element includes steps described below.

Priorities of text contents to be displayed are determined according to attribute contents of the direction sign in the electronic map data, and the text content that satisfies a priority condition is determined as drawing data of the direction sign according to the priorities of the text contents and a size condition of the direction sign in the map interface, where one or more size conditions exist, and the size condition corresponds to one or more types of text contents.

In an embodiment, since the direction sign needs to be displayed in a form of an image eventually and a display space of the image is limited, the priorities of the text contents to be displayed need to be determined, so as to make a certain choice of the text contents to be displayed. In the embodiments of the present disclosure, the priorities of the text contents to be displayed are determined through the attribute contents of the direction sign so that it is determined that the important content of the current direction sign may be displayed preferentially. For example, in a case of sequence display, the national link>the provincial link>the county link>the country link, and the link is displayed based on the name priorities through link codes. Different devices for viewing the electronic map, such as mobile phones, computers and car machines, have different requirements for a display size of the sign, so the display size on the map needs to be dynamically adjusted, and the adjustment of the display size affects how much text content is displayed. After the display size of the current sign is determined, a length of the text content that may be displayed under the current size may be obtained, the text contents are sorted from high to low according to the priorities, and the text content to be displayed before the length of the text content that may be displayed is determined as the drawing data.

Figure 4C:
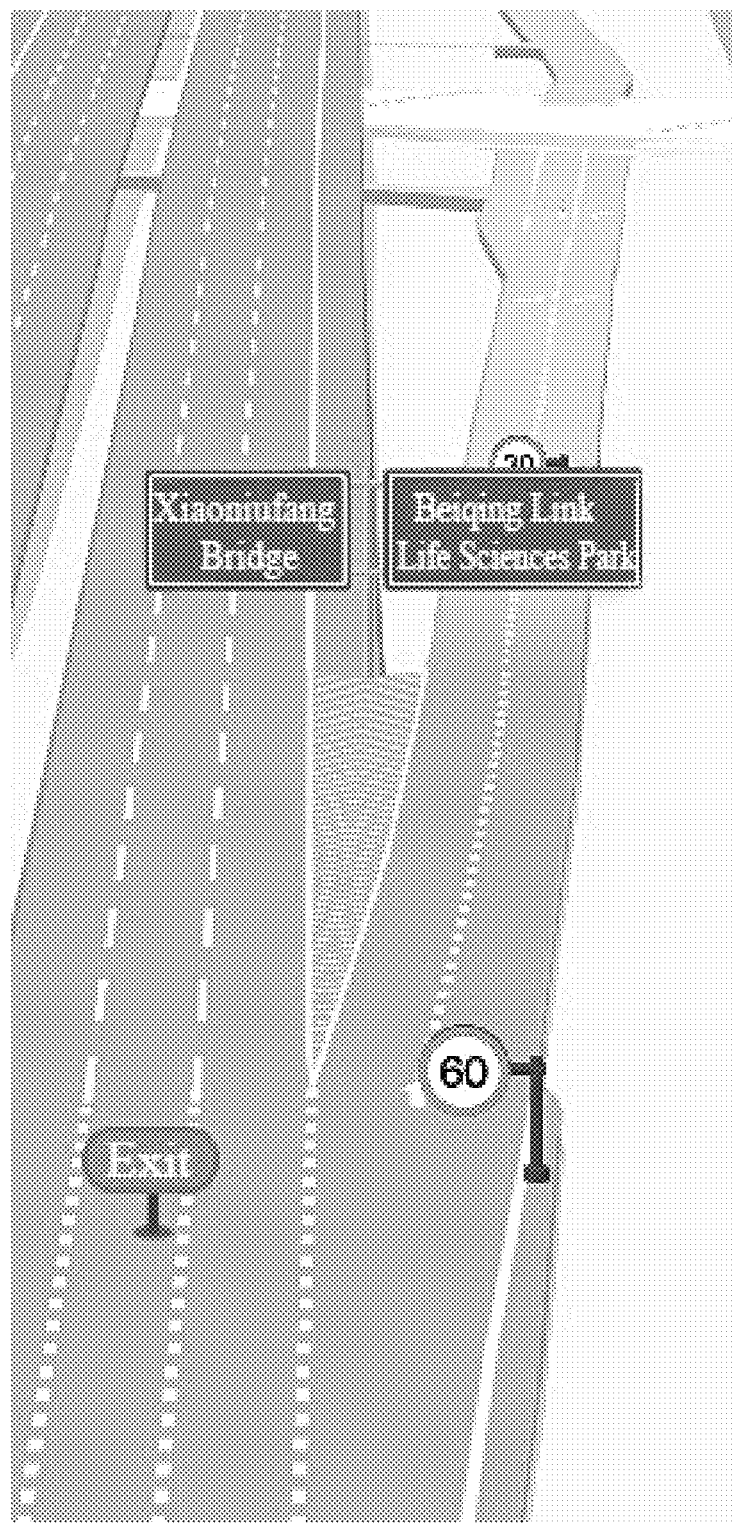
FIG. 4C is a schematic diagram of a display effect of direction signs to which an embodiment of the present disclosure is applicable.

FIG. 4C is a schematic diagram of a display effect that is achievable through the schemes of the embodiments of the present disclosure when non-link elements are direction signs to which the embodiments of the present disclosure are applicable.

Figure 5A:
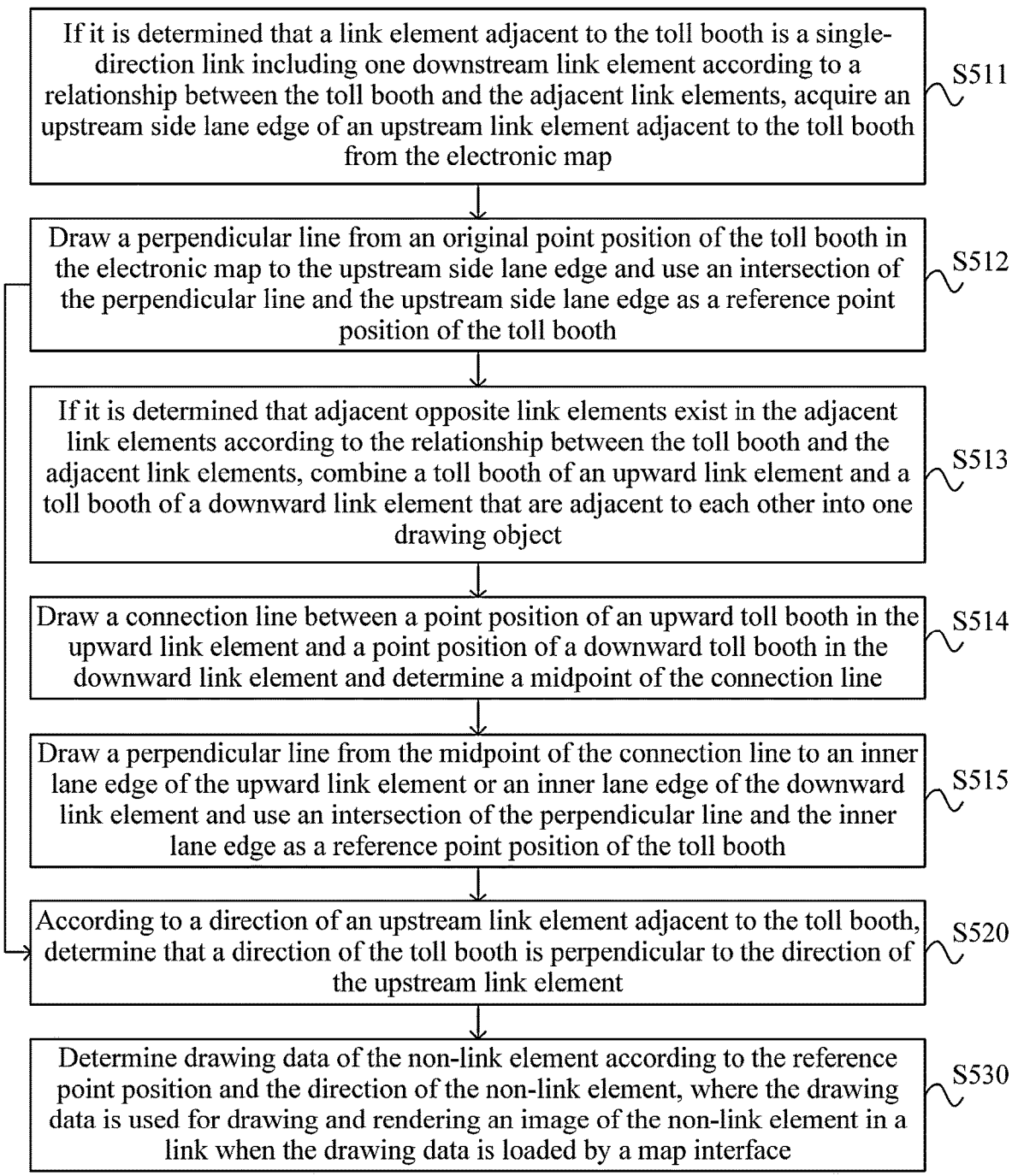
FIG. 5A is a flowchart of a method for determining drawing data of a map element according to another embodiment of the present disclosure.

FIG. 5A is a flowchart of a method for determining drawing data of a map element according to another embodiment of the present disclosure. Based on the preceding embodiments, in this embodiment, in the case where the non-link element is a toll booth, the step in which "the reference point position of the non-link element is determined according to the relationship between the non-link element and the adjacent link elements in the electronic map and based on the lane edge positions of the adjacent link elements" is refined into that "if it is determined that a link element adjacent to the toll booth is a single-direction link including one downstream link element according to a relationship between the toll booth and the adjacent link elements, an upstream side lane edge of an upstream link element adjacent to the toll booth is acquired from the electronic map; and a perpendicular line from an original point position of the toll booth in the electronic map to the upstream side lane edge is drawn and an intersection of the perpendicular line and the upstream side lane edge is used as a reference point position of the toll booth" or "if it is determined that adjacent opposite link elements exist in the adjacent link elements according to a relationship between the toll booth and the adjacent link elements, a toll booth of an upward link element and a toll booth of a downward link element that are adjacent to each other are combined into one drawing object; a connection line between a point position of an upward toll booth in the upward link element and a point position of a downward toll booth in the downward link element is drawn and a midpoint of the connection line is determined; and a perpendicular line from the midpoint of the connection line to an inner lane edge of the upward link element or an inner lane edge of the downward link element is drawn and an intersection of the perpendicular line and the inner lane edge is used as a reference point position of the toll booth", there describing how to determine the reference point position of the toll booth in the case where the non-link element is the toll booth.

In an embodiment, referring to FIG. 5A, the method may include steps described below.

In S511, if it is determined that a link element adjacent to the toll booth is a single-direction link including one downstream link element according to a relationship between the toll booth and the adjacent link elements, an upstream side lane edge of an upstream link element adjacent to the toll booth is acquired from the electronic map.

In S512, a perpendicular line from an original point position of the toll booth in the electronic map to the upstream side lane edge is drawn and an intersection of the perpendicular line and the upstream side lane edge is used as a reference point position of the toll booth.

In an embodiment, the adjacent link elements of the current toll booth are acquired, and if the adjacent link elements include one upstream link element and one downstream link element, it means that the link where the current toll booth is located is a single-direction link, and only vehicles in one direction are charged at the current toll booth. An unprocessed original point position of the toll booth in the electronic map and the upstream side lane edge of the upstream link element are acquired. After the perpendicular line from the original point position to the side lane edge line is drawn, the intersection of the perpendicular line and the side lane edge is configured to be the reference point position of the toll booth, where the side lane edge may be a side lane edge on the other side corresponding to the side where the original point position is located.

In S513, if it is determined that adjacent opposite link elements exist in the adjacent link elements according to the relationship between the toll booth and the adjacent link elements, a toll booth of an upward link element and a toll booth of a downward link element that are adjacent to each other are combined into one drawing object.

In S514, a connection line between a point position of an upward toll booth in the upward link element and a point position of a downward toll booth in the downward link element is drawn and a midpoint of the connection line is determined.

In S515, a perpendicular line from the midpoint of the connection line to an inner lane edge of the upward link element or an inner lane edge of the downward link element is drawn and an intersection of the perpendicular line and the inner lane edge is used as a reference point position of the toll booth.

The point positions of the upstream toll booth and the downstream toll booth may be the original point positions provided in the electronic map. The inner lane edge is a side lane edge on an adjacent side of the opposite link elements.

In an embodiment, the adjacent link elements of the current toll booth are acquired, and if the adjacent opposite link elements exist in the adjacent link elements, it means that the link where the current toll booth is located is a two-way link, and vehicles driven in two opposite directions are charged at the current toll booth. If the toll booths in two directions are drawn separately, the images of the two toll booths may not be connected together due to the position deviation, and thus a rendering effect is relatively poor. Therefore, the toll booths in the two directions may be combined into a same direction for drawing. In internal drawing data of the electronic map, two toll booth elements may be used as one drawing object to record the drawing data.

Since the link is a two-way passage, a point position of the toll booth on each link is displayed in the each link. Respective point positions of two toll booths are connected to obtain a connection line, a midpoint of the connection line is obtained, a perpendicular line from the midpoint of the connection line to an inner lane edge of the upward link element or an inner lane edge of the downward link element of the link in one direction in the opposite link elements is drawn, and the intersection of the perpendicular line and the inner lane edge is used as the reference point position of the toll booth.

Figure 5B:
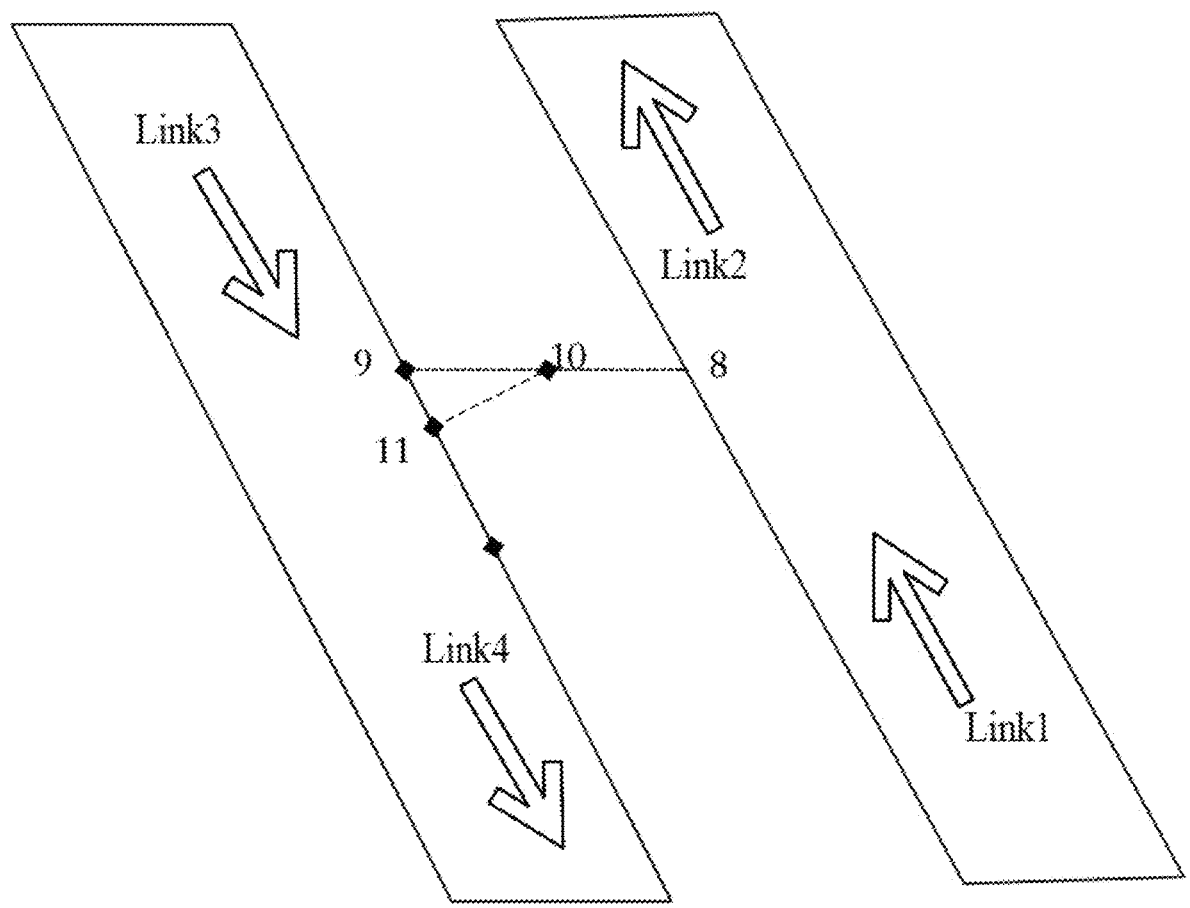
FIG. 5B is a schematic diagram of determination of reference point positions of toll booths in opposite lanes to which an embodiment of the present disclosure is applicable.

For example, FIG. 5B is a schematic diagram of determination of reference point positions of toll booths in opposite lanes to which an embodiment of the present disclosure is applicable. The electronic map records that a first toll booth exists between the first link (link1) and the second link (link2) and that a second toll booth exists between the third link (link3) and the fourth link (link4). Points 8 and 9 are the original point positions of corresponding toll booths in two opposite links, respectively, point 10 is a midpoint of a connection line between points 8 and 9, and point 11 is an intersection of a perpendicular line corresponding to point 10 and an inner side boundary line, that is, the finally determined reference point of the tool booth. In an actual scenario, the difference between the original point positions of the toll booths on two sides is very small, so the gap between the reference point positions and each of the two original point positions is small, thereby not affecting a drawing effect of the toll booths on two sides.

In S520, according to a direction of an upstream link element adjacent to the toll booth, it is determined that a direction of the toll booth is perpendicular to the direction of the upstream link element.

In an embodiment, the direction of the toll booth is a direction of a perpendicular line from the reference point position of the toll booth calculated from the previous step to a link lane edge on the other side, where the perpendicular line is perpendicular to the direction of the upstream link element, and the direction of the perpendicular line is a direction of passages of the toll booth.

In an embodiment, position data of each passage of the toll booth is calculated according to the reference point position of the toll booth, a link width of a single link element or link widths of the upward link element and the downward link element corresponding to the toll booth, and a number of passages of the toll booth and determined as drawing data of the toll booth.

In an embodiment, based on that the reference point position has been obtained, the link width of the single link element or the link widths of the upward link element and the downward link element corresponding to the current toll booth and the number of passages of the toll booth are further acquired, so as to calculate the specific position data of each passage in the tool booth, and the calculate specific position data is used as the drawing data. Compared with the existing scheme in which only an approximate position of the toll booth is displayed, in the embodiments of the present disclosure, the position of each passage in the toll booth is determined and the drawing data is generated, which makes the display of the position information of the toll booth more specific and user-friendly.

In S530, drawing data of the non-link element is determined according to the reference point position and the direction of the non-link element, where the drawing data is used for drawing and rendering an image of the non-link element in a link when the drawing data is loaded by a map interface.

Figure 5C:
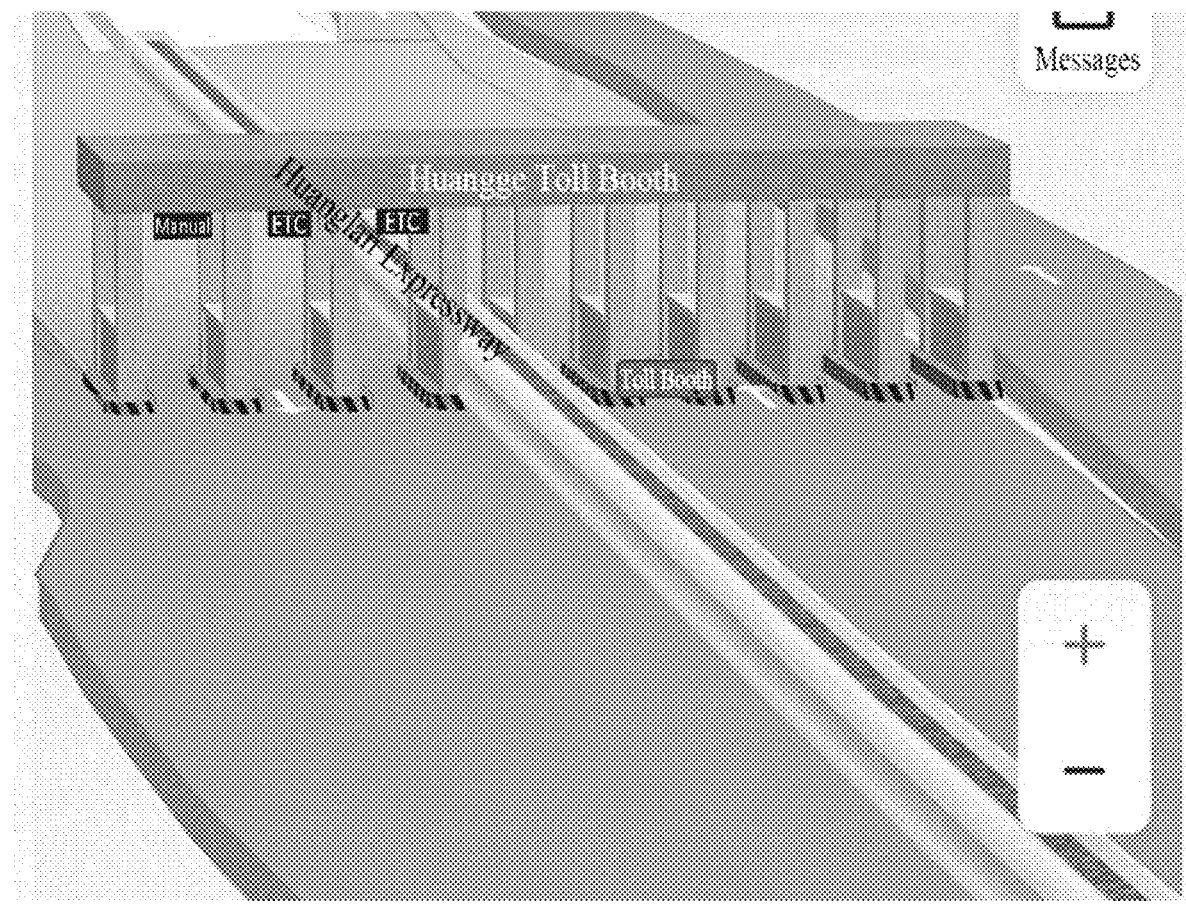
FIG. 5C is a schematic diagram of a display effect of toll booths to which an embodiment of the present disclosure is applicable.

FIG. 5C is a schematic diagram of a display effect that is achievable through the embodiments of the present disclosure in the case where the non-link element is a toll booth in the embodiments of the present disclosure. In this example, the toll booth may have 3 passages or 4 passages, the number of passages and the link widths may be determined from the electronic map, and then the width and size of each passage may be calculated. In a preset toll booth template with the rendered data, data such as the shape and color of the top of the toll booth and the column of the passage may be preset.

Figure 6:
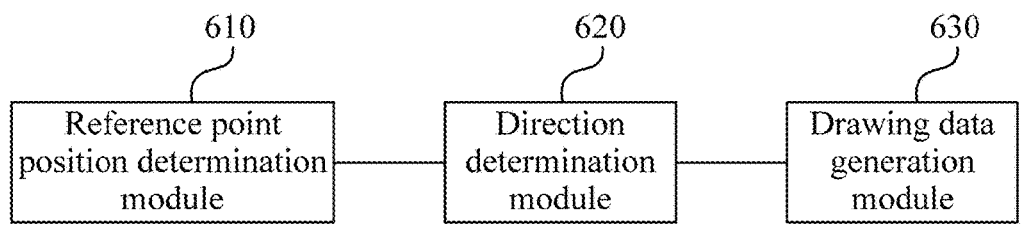
FIG. 6 is a structural diagram of an apparatus for determining drawing data of a map element according to another embodiment of the present disclosure.

FIG. 6 is a structural diagram of an apparatus for determining drawing data of a map element according to another embodiment of the present disclosure. This embodiment may be applicable to the case of browsing a display element in the map through the electronic map. The apparatus may be implemented in software and/or hardware. The apparatus may be configured in an electronic device with corresponding processing capabilities, and referring to FIG. 6, the apparatus includes a reference point position determination module 610, a direction determination module 620, and a drawing data generation module 630.

The reference point position determination module 610 is configured to determine a reference point position of a non-link element according to a relationship between the non-link element and adjacent link elements in an electronic map and based on lane edge positions of the adjacent link elements.

The direction determination module 620 is configured to determine a direction of the non-link element according to the relationship between the non-link element and the adjacent link elements.

The drawing data generation module 630 is configured to determine drawing data of the non-link element according to the reference point position and the direction of the non-link element, where the drawing data is used for drawing and rendering an image of the non-link element in a link when the drawing data is loaded by a map interface.

The apparatus and modules may perform the method for determining drawing data of a map element provided in any embodiment of the present disclosure and have functional modules and beneficial effects corresponding to the executed method.

In an embodiment, the apparatus further includes a text content determination module configured to determine text contents of the non-link element according to attribute contents of the non-link element in electronic map data and determine the text contents as the drawing data of the non-link element.

In an embodiment, the reference point position determination module 610 includes a sign point position determination unit and a toll booth point position determination unit.

In an embodiment, the sign point position determination unit includes a single sign point position determination subunit.

The single sign point position determination subunit is configured to, in the case where the non-link element is a direction sign, if it is determined that a link element adjacent to the direction sign is a single-direction link including one downstream link element according to a relationship between the direction sign and the adjacent link elements, acquire an upstream side lane edge of an upstream link element adjacent to the direction sign from the electronic map; and draw a perpendicular line from an original point position of the direction sign in the electronic map to the upstream side lane edge and use an intersection of the perpendicular line and the upstream side lane edge as a reference point position of the direction sign.

In an embodiment, the sign point position determination unit includes a multi-direction sign point position determination subunit.

The multi-direction sign point position determination subunit is configured to, in the case where the non-link element is a direction sign, if it is determined that a link element adjacent to the direction sign is a multi-direction link including multiple downstream link elements according to a relationship between the direction sign and the adjacent link elements, combine direction signs corresponding to the multiple downstream link elements into one drawing object; if it is determined that one link element is a ramp and a link element adjacent to the one link element is a main link according to link levels of the multiple downstream link elements, acquire a lane edge of the ramp closer to the main link from the electronic map; and if it is determined that the lane edge is a non-diversion line, use a starting point of the lane edge as a reference point position of the direction sign.

In an embodiment, the sign point position determination unit includes a diversion area point position determination subunit.

The diversion area point position determination subunit is configured to, in the case where the non-link element is the direction sign, if it is determined that the lane edge is a diversion line, acquire a lane edge of the main link closer to the ramp as a main link lane edge, where the lane edge of the ramp closer to the main link is used as a ramp lane edge; and determine a midpoint of a fitting curve between an end point of the main link lane edge and an end point of the ramp lane edge as the reference point position of the direction sign.

In an embodiment, the toll booth point position determination unit includes a single-direction point position determination subunit.

The single-direction point position determination subunit is configured to, in the case where the non-link element is a toll booth, if it is determined that a link element adjacent to the toll booth is a single-direction link including one downstream link element according to a relationship between the toll booth and the adjacent link elements, acquire an upstream side lane edge of an upstream link element adjacent to the toll booth from the electronic map; and draw a perpendicular line from an original point position of the toll booth in the electronic map to the upstream side lane edge and use an intersection of the perpendicular line and the upstream side lane edge as a reference point position of the toll booth.

In an embodiment, the toll booth point position determination unit includes an opposite-direction point position determination subunit.

The opposite-direction point position determination subunit is configured to, in the case where the non-link element is a toll booth, if it is determined that adjacent opposite link elements exist in the adjacent link elements according to a relationship between the toll booth and the adjacent link elements, combine a toll booth of an upward link element and a toll booth of a downward link element that are adjacent to each other into one drawing object; draw a connection line between a point position of an upward toll booth in the upward link element and a point position of a downward toll booth in the downward link element and determine a midpoint of the connection line; and draw a perpendicular line from the midpoint of the connection line to an inner lane edge of the upward link element or an inner lane edge of the downward link element and use an intersection of the perpendicular line and the inner lane edge as a reference point position of the toll booth.

In an embodiment, the direction determination module includes a sign direction determination unit and a toll booth direction determination unit.

In an embodiment, the sign direction determination unit is configured to, in the case where the non-link element is a direction sign, determine, according to a direction of an upstream link element adjacent to the direction sign, that a direction of the direction sign is perpendicular to the direction of the upstream link element.

In an embodiment, the sign direction determination unit includes a single-direction determination subunit.

The single-direction determination subunit is configured to, in the case where the non-link element is the direction sign, if a link element adjacent to the direction sign is a single-direction link including one downstream link element, determine that a sign plane of the direction sign points to a lane boundary line on another side of the one downstream link element from the reference point position along the direction of the direction sign.

In an embodiment, the sign direction determination unit includes a multi-direction determination subunit.

The multi-direction determination subunit is configured to, if a link element adjacent to the direction sign is a multi-direction link including multiple downstream link elements, determine that a sign plane of a direction sign corresponding to each downstream link element points to a lane boundary line on another side of the each downstream link element from the reference point position along the direction of the direction sign.

In an embodiment, the toll booth direction determination unit is configured to, in the case where the non-link element is a toll booth, determine, according to a direction of an upstream link element adjacent to the toll booth, that a direction of the toll booth is perpendicular to the direction of the upstream link element.

In an embodiment, the drawing data generation module 630 includes a sign drawing data generation unit and a toll booth drawing data generation unit.

In an embodiment, the sign drawing data generation unit is configured to, in the case where the non-link element is a direction sign, determine priorities of text contents to be displayed according to attribute contents of the direction sign in the electronic map data; and according to the priorities of the text contents and a size condition of the direction sign in the map interface, determine the text content that satisfies a priority condition as drawing data of the direction sign; where one or more size conditions exist, and the size condition corresponds to one or more types of text contents.

In an embodiment, the toll booth drawing data generation unit is configured to, in the case where the non-link element is a toll booth, calculate position data of each passage of the toll booth according to the reference point position of the toll booth, a link width of a single link element or link widths of the upward link element and the downward link element corresponding to the toll booth, and a number of passages of the toll booth, and determine the calculated position data as drawing data of the toll booth.

The further described apparatus and modules may perform the method for determining drawing data of a map element provided in any embodiment of the present disclosure and have functional modules and beneficial effects corresponding to the executed method.

According to the embodiments of the present disclosure, the present disclosure further provides an electronic device, a readable storage medium, and a computer program product.

Figure 7:
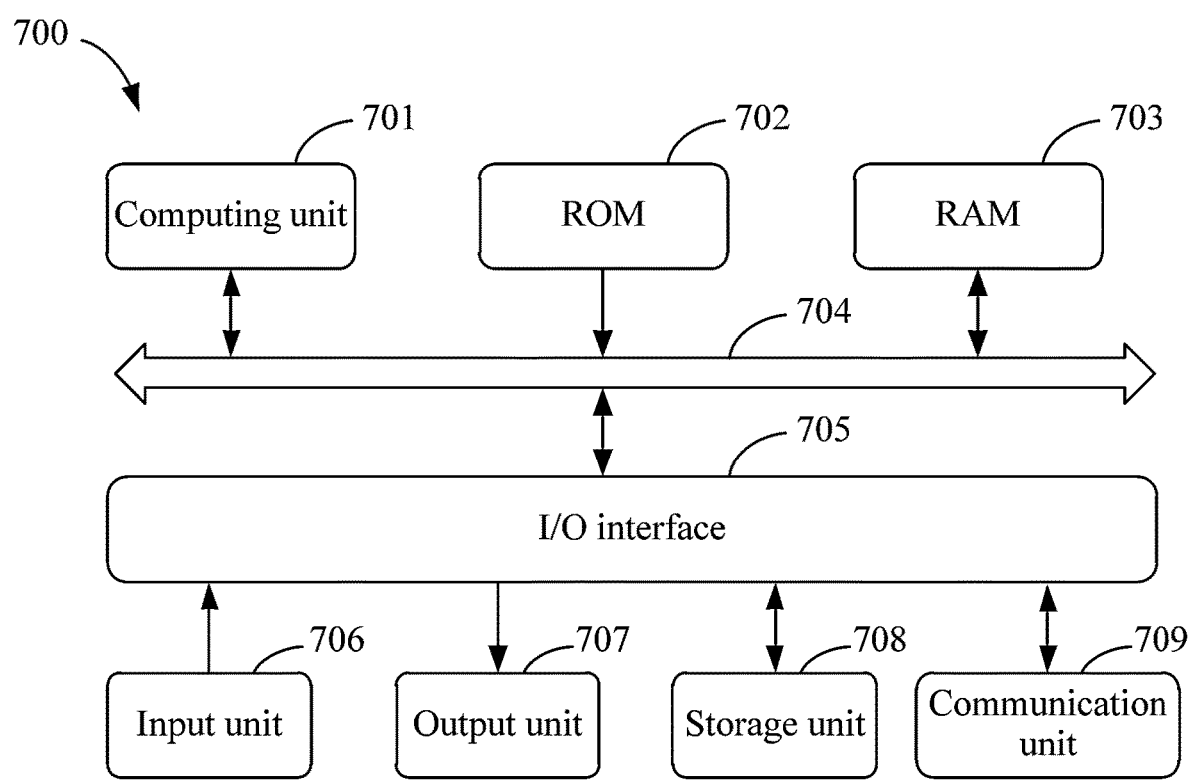
FIG. 7 is a block diagram of an electronic device for performing a method for determining drawing data of a map element according to an embodiment of the present disclosure.

FIG. 7 is a block diagram illustrating an exemplary electronic device 700 that may be configured to perform the embodiments of the present disclosure. Electronic devices are intended to represent various forms of digital computers, for example, a laptop computer, a desktop computer, a worktable, a personal digital assistant, a server, a blade server, a mainframe computer or another applicable computer. Electronic devices may further represent various forms of mobile apparatuses, for example, personal digital assistants, cellphones, smartphones, wearable devices, and other similar computing apparatuses. Herein the shown components, the connections and relationships between these components, and the functions of these components are illustrative only and are not intended to limit the implementation of the present disclosure as described and/or claimed herein.

As shown in FIG. 7, the device 700 includes a computing unit 701. The computing unit 701 may perform various types of appropriate operations and processing based on a computer program stored in a read-only memory (ROM) 702 or a computer program loaded from a storage unit 708 to a random-access memory (RAM) 703. Various programs and data required for operations of a storage device 700 may also be stored in the RAM 703. The computing unit 701, the ROM 702 and the RAM 703 are connected to each other by a bus 704. An input/output (I/O) interface 705 is also connected to the bus 704.

Multiple components in the device 700 are connected to the I/O interface 705. The multiple components include an input unit 706 such as a keyboard and a mouse, an output unit 707 such as various types of displays and speakers, the storage unit 708 such as a magnetic disk and an optical disk, and a communication unit 709 such as a network card, a modem or a wireless communication transceiver. The communication unit 709 allows the device 700 to exchange information/data with other devices over a computer network such as the Internet and/or various telecommunications networks.

The computing unit 701 may be various general-purpose and/or special-purpose processing components having processing and computing capabilities. Examples of the computing unit 701 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. The computing unit 701 performs various methods and processing described above, such as the method for determining drawing data of a map element. For example, in some embodiments, the method for determining drawing data of a map element may be implemented as a computer software program tangibly contained in a machine-readable medium such as the storage unit 708. In some embodiments, part or all of computer programs may be loaded and/or installed on the device 700 via the ROM 702 and/or the communication unit 709. When the computer program is loaded to the RAM 703 and executed by the computing unit 701, one or more steps of the method for determining drawing data of a map element described above may be performed. Alternatively, in other embodiments, the computing unit 701 may be configured, in any other suitable manner (for example, by means of firmware), to perform the method for determining drawing data of a map element.

Herein various embodiments of the systems and techniques described in the preceding may be performed in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs may be executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementation of the methods of the present disclosure may be written in one programming language or any combination of multiple programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any appropriate combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A method for determining drawing data of a map element, comprising:
    determining a reference point position of a non-link element according to a relationship between the non-link element and adjacent link elements in an electronic map and based on lane edge positions of the adjacent link elements;
    determining a direction of the non-link element according to the relationship between the non-link element and the adjacent link elements; and
    determining drawing data of the non-link element according to the reference point position and the direction of the non-link element, wherein the drawing data is used for drawing and rendering an image of the non-link element in a link when the drawing data is loaded by a map interface;
    wherein the reference point position of the non-link element is on a lane edge on either side of the link or at a center of lane edges on two sides of the link; the direction of the non-link element is related to the link and is used to enable a user to see an effect matching a direction of the link from the electronic map; and the direction of the non-link element is same with the direction of the link or at a set angle with the direction of the link.

2. The method of claim 1, further comprising:
    determining text contents of the non-link element according to attribute contents of the non-link element in electronic map data and determining the text contents as the drawing data of the non-link element.

3. The method of claim 1, wherein in a case where the non-link element is a direction sign, determining the reference point position of the non-link element according to the relationship between the non-link element and the adjacent link elements in the electronic map and based on the lane edge positions of the adjacent link elements comprises:
    in a case where it is determined that a link element adjacent to the direction sign is a single-direction link comprising one downstream link element according to a relationship between the direction sign and the adjacent link elements, acquiring an upstream side lane edge of an upstream link element adjacent to the direction sign from the electronic map; and
    drawing a perpendicular line from an original point position of the direction sign in the electronic map to the upstream side lane edge, and using an intersection of the perpendicular line and the upstream side lane edge as a reference point position of the direction sign.

4. The method of claim 2, wherein in a case where the non-link element is a direction sign, determining the reference point position of the non-link element according to the relationship between the non-link element and the adjacent link elements in the electronic map and based on the lane edge positions of the adjacent link elements comprises:
    in a case where it is determined that a link element adjacent to the direction sign is a single-direction link comprising one downstream link element according to a relationship between the direction sign and the adjacent link elements, acquiring an upstream side lane edge of an upstream link element adjacent to the direction sign from the electronic map; and
    drawing a perpendicular line from an original point position of the direction sign in the electronic map to the upstream side lane edge, and using an intersection of the perpendicular line and the upstream side lane edge as a reference point position of the direction sign.

5. The method of claim 1, wherein in a case where the non-link element is a direction sign, determining the reference point position of the non-link element according to the relationship between the non-link element and the adjacent link elements in the electronic map and based on the lane edge positions of the adjacent link elements comprises:
    in a case where it is determined that a link element adjacent to the direction sign is a multi-direction link comprising a plurality of downstream link elements according to a relationship between the direction sign and the adjacent link elements, combining direction signs corresponding to the plurality of downstream link elements into one drawing object;
    in a case where it is determined that one link element of the plurality of downstream link elements is a ramp and a link element adjacent to the one link element is a main link according to link levels of the plurality of downstream link elements, acquiring a lane edge of the ramp closer to the main link from the electronic map; and
    in a case where it is determined that the lane edge is a non-diversion line, using a starting point of the lane edge as a reference point position of the direction sign.

6. The method of claim 2, wherein in a case where the non-link element is a direction sign, determining the reference point position of the non-link element according to the relationship between the non-link element and the adjacent link elements in the electronic map and based on the lane edge positions of the adjacent link elements comprises:
  in a case where it is determined that a link element adjacent to the direction sign is a multi-direction link comprising a plurality of downstream link elements according to a relationship between the direction sign and the adjacent link elements, combining direction signs corresponding to the plurality of downstream link elements into one drawing object;
  in a case where it is determined that one link element of the plurality of downstream link elements is a ramp and a link element adjacent to the one link element is a main link according to link levels of the plurality of downstream link elements, acquiring a lane edge of the ramp closer to the main link from the electronic map; and
  in a case where it is determined that the lane edge is a non-diversion line, using a starting point of the lane edge as a reference point position of the direction sign.

7. The method of claim 5, after acquiring the lane edge of the ramp closer to the main link from the electronic map, further comprising:
  in a case where it is determined that the lane edge is a diversion line, acquiring a lane edge of the main link closer to the ramp as a main link lane edge, wherein the lane edge of the ramp closer to the main link is used as a ramp lane edge; and
  determining a midpoint of a fitting curve between an end point of the main link lane edge and an end point of the ramp lane edge as the reference point position of the direction sign.

8. The method of claim 1, wherein in a case where the non-link element is a direction sign, determining the direction of the non-link element according to the relationship between the non-link element and the adjacent link elements comprises:
  determining, according to a direction of an upstream link element adjacent to the direction sign, that a direction of the direction sign is perpendicular to the direction of the upstream link element.

9. The method of claim 2, wherein in a case where the non-link element is a direction sign, determining the direction of the non-link element according to the relationship between the non-link element and the adjacent link elements comprises:
  determining, according to a direction of an upstream link element adjacent to the direction sign, that a direction of the direction sign is perpendicular to the direction of the upstream link element.

10. The method of claim 8, after determining that the direction of the direction sign is perpendicular to the direction of the upstream link element, further comprising:
  in a case where a link element adjacent to the direction sign is a single-direction link comprising one downstream link element, determining that a sign plane of the direction sign points to a lane boundary line on another side of the one downstream link element from the reference point position along the direction of the direction sign; and
  in a case where the link element adjacent to the direction sign is a multi-direction link comprising a plurality of downstream link elements, determining that a sign plane of a direction sign corresponding to each of the plurality of downstream link elements points to a lane boundary line on another side of the each of the plurality of downstream link elements from the reference point position along the direction of the direction sign.

11. The method of claim 2, wherein in a case where the non-link element is a direction sign, determining the text contents of the non-link element according to the attribute contents of the non-link element in the electronic map data and determining the text contents as the drawing data of the non-link element comprises:
  determining priorities of text contents to be displayed according to attribute contents of the direction sign in the electronic map data; and
  determining, according to the priorities of the text contents and at least one size condition of the direction sign in the map interface, a text content that satisfies a priority condition as drawing data of the direction sign;
  wherein one of the at least one size condition corresponds to at least one type of text content.

12. The method of claim 1, wherein in a case where the non-link element is a toll booth, determining the reference point position of the non-link element according to the relationship between the non-link element and the adjacent link elements in the electronic map and based on the lane edge positions of the adjacent link elements comprises:
  in a case where it is determined that a link element adjacent to the toll booth is a single-direction link comprising one downstream link element according to a relationship between the toll booth and the adjacent link elements, acquiring an upstream side lane edge of an upstream link element adjacent to the toll booth from the electronic map; and
  drawing a perpendicular line from an original point position of the toll booth in the electronic map to the upstream side lane edge and using an intersection of the perpendicular line and the upstream side lane edge as a reference point position of the toll booth.

13. The method of claim 1, wherein in a case where the non-link element is a toll booth, determining the reference point position of the non-link element according to the relationship between the non-link element and the adjacent link elements in the electronic map and based on the lane edge positions of the adjacent link elements comprises:
  in a case where it is determined that adjacent opposite link elements exist in the adjacent link elements according to a relationship between the toll booth and the adjacent link elements, combining a toll booth of an upward link element and a toll booth of a downward link element that are adjacent to each other into one drawing object, wherein the adjacent opposite link elements comprise the upward link element and the downward link element;
  drawing a connection line between a point position of an upward toll booth in the upward link element and a point position of a downward toll booth in the downward link element and determining a midpoint of the connection line; and
  drawing a perpendicular line from the midpoint of the connection line to an inner lane edge of the upward link element or an inner lane edge of the downward link element and using an intersection of the perpendicular line and the inner lane edge as a reference point position of the toll booth.

14. The method of claim 12, wherein in a case where the non-link element is the toll booth, determining the direction of the non-link element according to the relationship between the non-link element and the adjacent link elements comprises:
 determining, according to a direction of an upstream link element adjacent to the toll booth, that a direction of the toll booth is perpendicular to the direction of the upstream link element.

15. The method of claim 13, wherein in a case where the non-link element is the toll booth, determining the direction of the non-link element according to the relationship between the non-link element and the adjacent link elements comprises:
 determining, according to a direction of an upstream link element adjacent to the toll booth, that a direction of the toll booth is perpendicular to the direction of the upstream link element.

16. The method of claim 14, further comprising:
 calculating position data of each of passages of the toll booth according to the reference point position of the toll booth, a link width of a single link element corresponding to the toll booth, and a number of the passages of the toll booth, and determining the calculated position data as drawing data of the toll booth.

17. The method of claim 15, further comprising:
 calculating position data of each of passages of the toll booth according to the reference point position of the toll booth, a link width of an upward link element and a link width of a downward link element corresponding to the toll booth, and a number of the passages of the toll booth, and determining the calculated position data as drawing data of the toll booth.

18. An electronic device, comprising:
 at least one processor; and
 a memory communicatively connected to the at least one processor;
 wherein the memory stores an instruction executable by the at least one processor, and the instruction is executed by the at least one processor to cause the at least one processor to perform:
  determining a reference point position of a non-link element according to a relationship between the non-link element and adjacent link elements in an electronic map and based on lane edge positions of the adjacent link elements;
  determining a direction of the non-link element according to the relationship between the non-link element and the adjacent link elements; and
  determining drawing data of the non-link element according to the reference point position and the direction of the non-link element, wherein the drawing data is used for drawing and rendering an image of the non-link element in a link when the drawing data is loaded by a map interface;
 wherein the reference point position of the non-link element is on a lane edge on either side of the link or at a center of lane edges on two sides of the link; the direction of the non-link element is related to the link and is used to enable a user to see an effect matching a direction of the link from the electronic map; and the direction of the non-link element is same with the direction of the link or at a set angle with the direction of the link.

19. The electronic device of claim 18, wherein the instruction is executed by the at least one processor to cause the at least one processor to further perform:
 determining text contents of the non-link element according to attribute contents of the non-link element in electronic map data and determining the text contents as the drawing data of the non-link element.

20. A non-transitory computer-readable storage medium storing computer instructions for causing a computer to perform:
 determining a reference point position of a non-link element according to a relationship between the non-link element and adjacent link elements in an electronic map and based on lane edge positions of the adjacent link elements;
 determining a direction of the non-link element according to the relationship between the non-link element and the adjacent link elements; and
 determining drawing data of the non-link element according to the reference point position and the direction of the non-link element, wherein the drawing data is used for drawing and rendering an image of the non-link element in a link when the drawing data is loaded by a map interface;
 wherein the reference point position of the non-link element is on a lane edge on either side of the link or at a center of lane edges on two sides of the link; the direction of the non-link element is related to the link and is used to enable a user to see an effect matching a direction of the link from the electronic map; and the direction of the non-link element is same with the direction of the link or at a set angle with the direction of the link.

* * * * *